Dec. 24, 1968 R. D. EVANS 3,418,472
PROCESS AND DETECTOR FOR INDICATING THE TRACKS OF ALPHA
PARTICLES USING STACKED LAYERS OF MATERIAL
Filed April 4, 1966
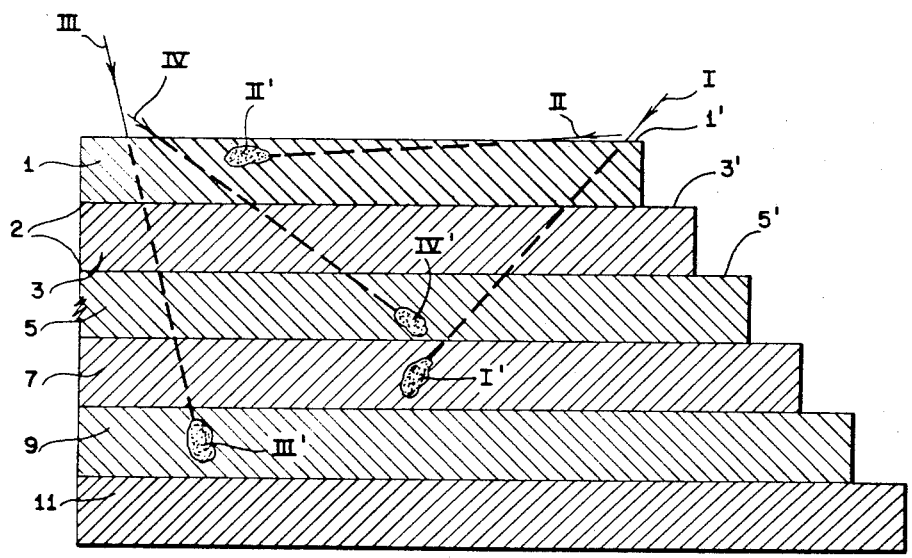
INVENTOR
ROBLEY D. EVANS
BY Rines and Rines
ATTORNEYS

United States Patent Office 3,418,472
Patented Dec. 24, 1968

3,418,472
PROCESS AND DETECTOR FOR INDICATING
THE TRACKS OF ALPHA PARTICLES USING
STACKED LAYERS OF MATERIAL
Robley D. Evans, 15 Hickory Lane,
Belmont, Mass. 02178
Filed Apr. 4, 1966, Ser. No. 539,684
11 Claims. (Cl. 250—83)

ABSTRACT OF THE DISCLOSURE

This disclosure deals with a plurality of stacked layers of material that is damaged by α-particle radiation and of thickness comparable with the effective etching depth of the material.

---

The present invention relates to processes for indicating the tracks of alpha particles and the like and to alpha-particle detectors, being more particularly directed to indicating tracks at depths in plastics and other solid media that cannot be indicated by conventional autoradiographic etching techniques.

Among the advantages of such autoradiographic etching techniques are the obviating of the necessity for utilizing any of the photographic film or electrical and electronic detecting mechanisms.

While mica and other materials have accordingly been used to indicate tracks of fission fragments by etching the same following irradiation by the fragments, this is feasible because of the extremely high radiation damage per unit of path length of the fragments (of the order of about 10 mev./mg./cm.$^2$). Such materials, however, are entirely unsuited to detect alpha particles in view of their much lower radiation damage per unit of path length. Though some measure of autoradiographic indication of alpha particle distributions along radiated nuclear fuel materials has been reported in the July 1965 issue of Nucleonics, pages 80 and 87, it is known, however (e.g., Fleischer et al., Physical Review 133, A1443–9 (1964)), that the radiation damage per unit path length is sufficient to produce tracks by etching only at the end portion of an alpha-particle track, at or near the peak of the so-called Bragg curve, where the residual kinetic energy of the slowed alpha particle is of the order of 0.5 mev. per nucleon (say, from about 0.2 mev. to 1.0 mev. per nucleon). No etchably detectable track is made while the alpha ray is moving at higher velocities.

Unfortunately, the detection of the damage produced in certain plastic materials subjected to alpha particle radiation is limited to such alpha-particle damage as occurs near the surfaces of the material, and thus is useful only to detect alpha particles that have already been slowed down before reaching the plastic material. Only if the alpha particle has created damage near or at the outer surfaces of the irradiated material is the alpha track indicated or uncovered by the etching process; the etching depth generally being effectable in practice up to about ten microns, more or less, with the etched damage hole of about the same radius—this depth being herein termed an effective etching depth. Many alpha particles, however, have relatively long track lengths within the medium and produce damage only near the end of their range and hence at depths that are not reached by the etching process; and thus, the presence of these tracks has not been detectable, though sought by investigators.

An object of the present invention, accordingly, is to solve the problem of indicating the tracks of alpha particles and the like at depths, in a plastic or other material irradiated by the particles, that are considerably greater than the effective etching depth of the material.

A further object is to provide a new and improved process for alpha-particle track detection and registration.

Still another object is to provide a novel autoradiographic process.

Another object is to provide a new and improved alpha-particle detector.

Other and further objects will be described hereinafter, being more particularly delineated in the appended claims. In summary, however, the invention contemplates the use of a plurality of stacked layers of the plastic or other solid medium, each layer being of thickness comparable with the effective etching depth of the material. After irradiation, the stacked layers may be separated and separately etched, thereby enabling alpha tracks to be detected that would otherwise be undetectable in solid media of the same thickness as the stack of layers.

The invention will now be described with reference to the accompanying drawing, the single figure of which is a schematic longitudinal section of a detector constructed in accordance with the invention, illustrating various alpha-track damaging regions.

Referring to the drawings, a plurality of layers 1,3,5,7,9, 11, etc., is illustrated, arranged in a stack and subjected to alpha-particle radiation at the upper surface of the uppermost layer 1, as indicated by the arrows I, II, III and IV. The alpha particles represented by these arrows I, II, III and IV are shown producing their damaging effect at substantially the same path distances within the material but, because of the different angles of incidence, at the respective track end portions I′, II′, III′ and IV′ in respective different internal layers 7, 1, 9 and 5. Only a glancingly incident alpha particle II causes its damaging effect within the uppermost layer 1.

As before stated, where the stack of layers replaced by a single medium, only the damage II′ produced in the upper layer 1 might be detected by the etching process, since it alone is within the few micron effective etching depth. None of the damaged areas I′ in interior layer 7, III′ in interior layer 9, or IV′ in interior layer 5 would be reached by the etching, and thus these tracks would remain undetected. This is the problem that has existed in this art despite efforts to solve the same.

In accordance with the stacked-layer construction of the invention, however, by making the thickness of each of the layers 1, 3, 5, 7, 9, 11, etc., substantially comparable to the depth of alpha track indication within the material that the etching will reach, this problem can be overcome and substantially complete detection of all alpha tracks attained. This is because, following irradiation, the layers 1, 3, 5, 7, 9, 11, may be peeled apart, as with the aid of stepped or offset tabs 1′, 3′, 5′, etc., or other equivalent identifying separating means, and then separately etched. Because of the critical predetermined thickness of the layers 1 with regard to effective etching depth, as before discussed, each of the damaged terminal track indications I′, II′, III′, and IV′ will be indicated and registerable as a result of the etching of the respective separated layers 7, 1, 9 and 5.

As a specific example, cellulose nitrate irradiated for autoradiographic alpha particle detection may, in practice, be etched by, for example, 6.5 N sodium hydroxide to an effective depth of from about 2 to about 5 microns in about a 4–6 minute period. Somewhat greater depths of penetration of the etching material may, however, be produced over more extended periods of time or at higher temperatures. By preadjusting the thickness of, for example, the thin cellulose nitrate layers that are stacked at 1, 3, 5, 7, 9, 11, such that each layer is of thickness comparable to the effective etching depth, say of the order of from substantially 3 to substantially 10 microns in thickness (since each layer is etched from both sides), previously undetectable alpha ray damaged areas of tracks can be indicated and registered. In order further to facilitate separation of the layers, they may be coated during preparation for the stacking by an extremely thin adherence-inhibiting layer 2 (of the order of a micron or less) as of silicone and the like. The layer 2 must also be removable during or prior to the etching.

Useful applications of stacked layers of this character include, for example, a radiation badge for detecting alpha particles resulting from the presence of radon gas or the like; a suitable stack comprising about six to ten layers, more or less, each of the above-mentioned thickness range.

While the invention has been described in connection with alpha particles, it will be evident that the process underlying the invention is also useful with other types of radiation including, for example, hydrogen ions, $He^{-3}$, $Li^{-6}$ and $Li^{-7}$, $B^{-10}$ and $B^{-11}$, $Be^{-9}$, particularly of residual kinetic energy of at least several mev./nucleon, that similarly produce tracks that effect damage to the plastic medium at regions beyond etchable track depth; and all such, for purposes of this application, are herein generically referred to as alpha particles and the like. Other suitable plastic materials for alpha particles include cellulose acetate and cellulose acetate-butyrate; and, for somewhat similar radiations above listed, may include Lexan polycarbonide resin, which may be etched by 6 N sodium hydroxide, and Mylar polyester resin.

Further modifications will also occur to those skilled in the art and are considered to fall within the spirit and scope of the invention as defined in the appended claims.

What is claimed is:

1. A process for indicating the tracks of alpha particles and the like entering a medium and producing damaging effects at depths therein below effective etching depths in said medium, that comprises, stacking a plurality of layers of the medium, each of thickness comparable with the said etching depths, irradiating the stacked layers with alpha particles and the like, separating the layers, and etching the separated layers, thereby to indicate the alpha-particle tracks.

2. An alpha-particle-irradiation process as claimed in claim 1 and in which the material of the said medium is selected from the group consisting of cellulose nitrate, cellulose acetate and cellulose acetate-butyrate.

3. A process as claimed in claim 1 and in which the said depths are of the order of a few microns.

4. A process as claimed in claim 3 and in which the said depths are of the order of from substantially 3 to substantially 10 microns.

5. A process as claimed in claim 1 and in which the material of the said medium is selected from the group consisting of celluose nitrate, cellulose acetate, cellulose acetate-butyrate, polycarbonate resin and polyester resin.

6. A detector for alpha particles and the like comprising a plurality of stacked etchable layers of material which can be damaged by alpha particles, each layer being of thickness comparable with the effective etching depth of said material.

7. A detector as claimed in claim 6 and in which the said layer thickness is of the order of from substantially 3 to substantially 10 microns.

8. An alpha-particle detector as claimed in claim 7 and in which the said material is selected from the group consisting of cellulose nitrate, cellulose acetate, and cellulose acetate-butyrate.

9. A detector for alpha particles and the like as claimed in claim 8 and in which the said group also includes polycarbonate and polyester resin.

10. A detector as claimed in claim 6 and in which means is provided for enabling the identifying and separating of said layers from the stack.

11. A detector as claimed in claim 6 and in which the said layers are separated by adherence-inhibiting means of thickness of the order of a micron and less.

References Cited

UNITED STATES PATENTS

| | | | |
|---|---|---|---|
| 2,928,946 | 3/1960 | Allisy | 250—83 |
| 3,303,085 | 2/1967 | Price et al. | |
| 3,335,278 | 8/1967 | Price et al. | 250—83.1 |

RALPH G. NILSON, *Primary Examiner.*

M. J. FROME, *Assistant Examiner.*

U.S. Cl. X.R.

250—83.1